United States Patent
Li et al.

(10) Patent No.: US 11,174,947 B2
(45) Date of Patent: Nov. 16, 2021

(54) MAGNETIC LIQUID SEALING DEVICE HAVING HEAT CONDUCTIVE ROD AND HEAT DISSIPATING JACKET

(71) Applicant: Tsinghua University, Beijing (CN)

(72) Inventors: Decai Li, Beijing (CN); Jixian Yang, Beijing (CN); Siyu Chen, Beijing (CN); Qian Li, Beijing (CN); Rui Sun, Beijing (CN); Xiao Liu, Beijing (CN); Zhenghao Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 90 days.

(21) Appl. No.: 16/764,627

(22) PCT Filed: Jan. 24, 2019

(86) PCT No.: PCT/CN2019/072998
§ 371 (c)(1),
(2) Date: May 15, 2020

(87) PCT Pub. No.: WO2020/150966
PCT Pub. Date: Jul. 30, 2020

(65) Prior Publication Data
US 2021/0123530 A1    Apr. 29, 2021

(51) Int. Cl.
*F16J 15/43* (2006.01)
*F16J 15/16* (2006.01)
(Continued)

(52) U.S. Cl.
CPC ............ *F16J 15/43* (2013.01); *F16C 33/765* (2013.01); *F16J 15/162* (2013.01); *F16C 33/1035* (2013.01); *F16C 33/746* (2013.01)

(58) Field of Classification Search
CPC .. F16C 19/525; F16C 33/1035; F16C 33/746; F16C 33/765; F16J 15/162; F16J 15/43
See application file for complete search history.

(56) References Cited

U.S. PATENT DOCUMENTS 4,486,026 A * 12/1984 Furumura ............. F16C 33/746
277/400
10,989,308 B1 * 4/2021 Li ............................ F16J 15/43
(Continued)

FOREIGN PATENT DOCUMENTS

| CN | 103925371 | 7/2014 |
| CN | 104455463 | 3/2015 |

(Continued)

OTHER PUBLICATIONS

WIPO, International Search Report and Written Opinion for PCT/CN2019/072998, dated Nov. 1, 2019.

*Primary Examiner* — Alan B Waits
(74) *Attorney, Agent, or Firm* — Hodgson Russ LLP

(57) ABSTRACT

A magnetic liquid sealing device (100) with a heat conductive rod and a heat dissipating jacket includes: a shaft casing (1), a rotating shaft (2), two bearings (3), two pole shoes (4), a permanent magnet (5), a heat conductive rod (6) and a heat dissipating jacket (7). The rotating shaft (2) is rotatably arranged in the shaft casing (1), two bearings (3) and two pole shoes (4) are fitted over the rotating shaft (2), and the two pole shoes (4) are located between the two bearings (3). The permanent magnet (5) is fitted over the rotating shaft (2) and is located between the two pole shoes (4). The heat conductive rod (6) is inserted in the pole shoe (4), the heat dissipating jacket (7) is fitted over the shaft casing (2), and the heat conductive rod (6) is connected with the heat dissipating jacket (7) through a connecting member (11).

18 Claims, 1 Drawing Sheet

(51) Int. Cl.
*F16C 33/76* (2006.01)
*F16C 33/10* (2006.01)
*F16C 33/74* (2006.01)

(56) References Cited

U.S. PATENT DOCUMENTS

2006/0043682 A1    3/2006  Li
2012/0314984 A1*  12/2012  Honda .................... F16C 33/82
                                                             384/462
2015/0316101 A1*  11/2015  Honda ................ F16C 33/6644
                                                             277/410
2017/0051833 A1*   2/2017  Sato ........................ F16C 33/78

FOREIGN PATENT DOCUMENTS

CN        204852354       12/2015
EP          0406520        4/1994

* cited by examiner

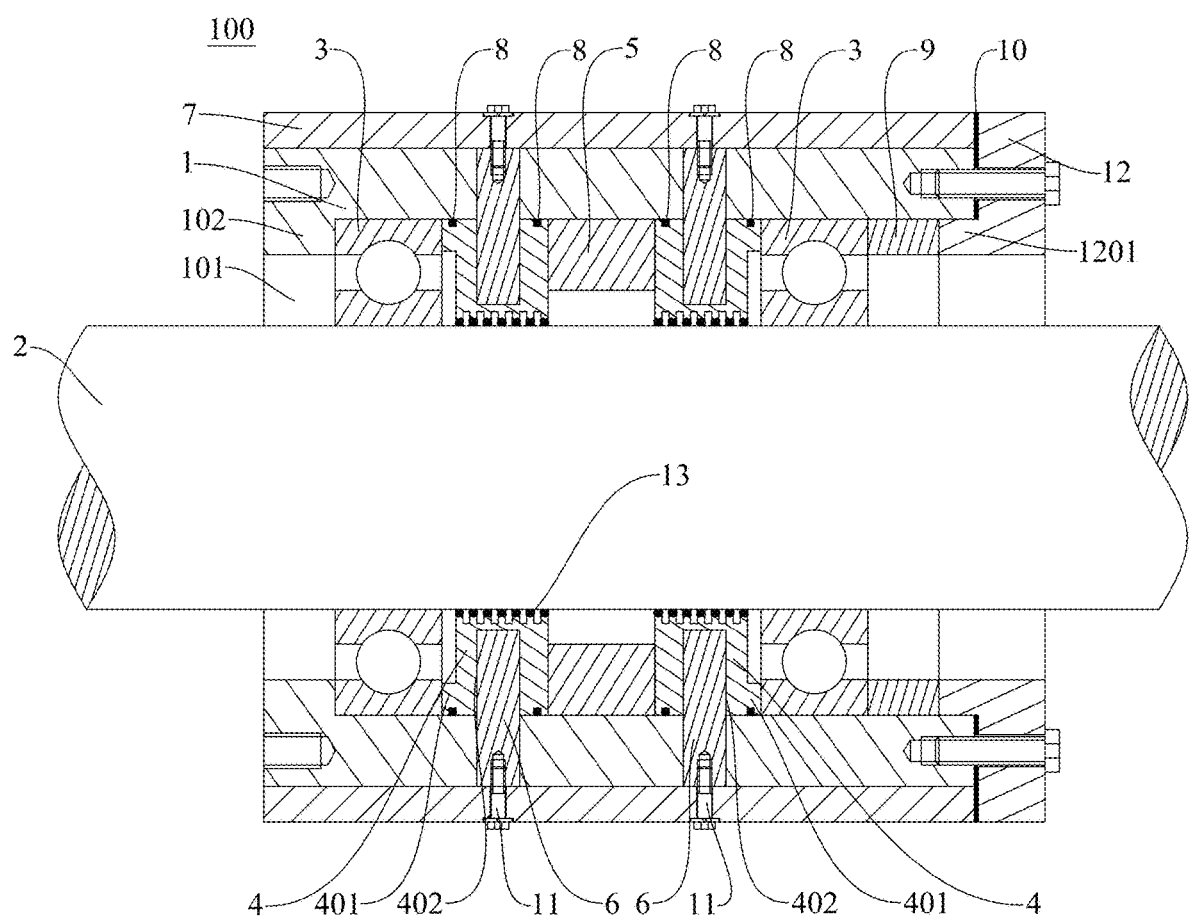

MAGNETIC LIQUID SEALING DEVICE HAVING HEAT CONDUCTIVE ROD AND HEAT DISSIPATING JACKET

CROSS-REFERENCE TO RELATED APPLICATION

This application is a U.S. national phase application of International Application No. PCT/CN2019/072998, filed Jan. 24, 2019, the entire disclosure of which is hereby incorporated by reference herein.

FIELD

The present disclosure relates to a field of mechanical engineering seals, and more particularly, to a magnetic liquid seal suitable for high-speed working conditions.

BACKGROUND

Sealing is a technical means to prevent medium leakage and is an extremely important part in engineering equipment, because the sealing effect and reliability often directly determine the service life and operation safety of the entire equipment. Once the seal fails, it not only affects the normal operation of the equipment, but also even causes serious personal safety or huge economic losses. Since magnetic liquid seals are able to completely achieve zero leakage and have advantages of no pollution, high reliability and long service life, the magnetic liquid seals play an irreplaceable role in some high-end sealing fields, and are especially suitable for critical equipment sealing at low and medium linear speeds.

In a case of high linear velocity, due to a shearing action of magnetic liquid, large frictional dissipation leads to a large temperature rise when the heat conductive condition is not good, which directly affects the magnetization performance of the magnetic liquid and permanent magnets, and affects the sealing effect. Most of current solutions are to design different water-cooling channels, such as a horizontal-channel circulating cooling magnetic liquid sealing device disclosed in the related art, but the water-cooling circulation effect is uneven, and a temperature gradient existing in the sealing device affects the sealing effect. The related art also discloses a high temperature magnetic liquid sealing water-cooling device which cools the magnetic liquid through an embedded water jacket fitted over an outer circle of a pole shoe. These devices all need a water-cooling system, and water cooling requires supporting facilities such as water pumps, causing extra space and maintenance costs. In a traditional magnetic liquid rotary sealing device, heat generated by the magnetic liquid in a sealing gap cannot be discharged in time. The related art discloses a Peltier cooling magnetic liquid sealing device which is cooled by a plurality of Peltiers arranged on a regular polygonal housing after being powered on.

Regardless of whether a magnetic liquid sealing device adopts water-cooling dissipation or circuit dissipation, the structure complexity of the magnetic liquid sealing device is increased, which is not convenient for production and practical use.

SUMMARY

The present disclosure seeks to solve at least one of the technical problems existing in the related art. Hence, the present disclosure proposes a magnetic liquid sealing device having a heat conductive rod and a heat dissipating jacket. The magnetic liquid sealing device does not need water-cooling dissipation or circuit dissipation, and has a simple structure and excellent dissipation effect.

The magnetic liquid sealing device according to embodiments of the present disclosure includes: a shaft casing defining a shaft chamber therein; a rotating shaft rotatably provided in the shaft chamber, and extending from one end of the shaft chamber to the other end of the shaft chamber; two bearings individually fitted over the rotating shaft; two pole shoes individually fitted over the rotating shaft and located between the two bearings, magnetic liquid being absorbed between an inner peripheral surface of each pole shoe and an outer peripheral surface of the rotating shaft, and an outer peripheral surface of each pole shoe having a blind hole extending along a radial direction of the pole shoe; a permanent magnet fitted over the rotating shaft and located between the two pole shoes; a heat conductive rod inserted in the blind hole; and a heat dissipating jacket fitted over the shaft casing, the heat conductive rod being connected with the heat dissipating jacket through a connecting member.

In the magnetic liquid sealing device with the heat conductive rod and the heat dissipating jacket according to the embodiments of the present disclosure, since the outer peripheral surface of the pole shoe is provided with the blind hole in which the heat conductive rod is inserted, and the heat dissipating jacket connected with the heat conductive rod is fitted over the shaft casing, the heat conductive rod can conduct the heat in a sealing gap to the heat dissipating jacket, so as to achieve quicker heat dissipation, thereby avoiding that the too high temperature in the sealing gap affects the magnetization performance of the magnetic liquid and the permanent magnet and hence deteriorates the sealing effect.

In some embodiments, a plurality of blind holes are provided on each pole shoe and distributed evenly along a circumferential direction.

In some embodiments, each of the two pole shoes is provided with a convex rim on a side away from the other pole shoe, the convex rim abutting against an outer circle of the bearing, and each of the two pole shoes abuts against an end surface of the permanent magnet on a side facing the other pole shoe.

In some embodiments, the magnetic liquid sealing device also includes: a pair of sealing rings provided between each pole shoe and the shaft casing, the heat conductive rod being located between the sealing rings arranged in pairs.

In some embodiments, one end of the shaft casing is formed with a first protrusion, one of the bearings abuts against the first protrusion, the other end of the shaft casing is connected with a flange, and the flange has a second protrusion extending into the shaft chamber.

In some specific embodiments, the magnetic liquid sealing device also includes: a sleeve fitted over the rotating shaft and located between the second protrusion and the other bearing.

In some specific embodiments, the magnetic liquid sealing device also includes: an adjusting washer sandwiched among the shaft casing, the heat dissipating jacket and the flange.

In some optional embodiments, the heat dissipating jacket is made of one material of red copper and heat conducting graphite.

In some embodiments, the thickness of the heat dissipating jacket is from 2 mm to 10 mm.

In some embodiments, one end of the heat conductive rod passes through the shaft casing and abuts against an inner peripheral surface of the heat dissipating jacket.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the present disclosure will become apparent and readily appreciated from the following descriptions of embodiments made with reference to the drawings.

FIG. 1 is a structural schematic view of a magnetic liquid sealing device having a heat conductive rod and a heat dissipating jacket according to embodiments of the present disclosure.

REFERENCE NUMERALS OF MAIN ELEMENTS magnetic liquid sealing device 100, shaft casing 1, shaft chamber 101, first protrusion 102, rotating shaft 2, bearing 3, pole shoe 4, convex rim 401, blind hole 402, permanent magnet 5, heat conductive rod 6, heat dissipating jacket 7, sealing ring 8, sleeve 9, adjusting washer 10, connecting member 11, flange 12, second protrusion 1201, magnetic liquid 13.

DETAILED DESCRIPTION

Embodiments of the present disclosure will be described in detail below, and examples of the embodiments will be illustrated in the accompanying drawings. The same or similar reference numerals represent the same or similar elements or the elements having the same or similar functions throughout the descriptions. The embodiments described below with reference to the accompanying drawings are exemplary, are merely used to explain the present disclosure, and cannot be construed to limit the present disclosure.

In the description of the present disclosure, it should be understood that terms such as "central," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," "circumferential" and the like should be construed to refer to the orientation as then described or as shown in the drawings under discussion. These terms are for convenience and simplification of description and do not indicate or imply that the device or element referred to must have a particular orientation, or be constructed and operated in a particular orientation, so these terms shall not be construed to limit the present disclosure. In addition, the feature defined with "first" and "second" may comprise one or more of this feature. In the description of the present disclosure, "a plurality of" means two or more than two, unless specified otherwise.

In the present disclosure, it should be noted, unless specified or limited otherwise, the terms "mounted," "connected," "coupled" or the like are used broadly. The terms may be, for example, fixed connections, detachable connections, or integral connections; may also be mechanical or electrical connections, may also be direct connections or indirect connections via intervening structures; and may also be inner communications of two elements, which can be understood by those skilled in the art according to specific situations.

A specific structure of a magnetic liquid sealing device 100 with a heat conductive rod and a heat dissipating jacket according to embodiments of the present disclosure will be described below with reference to FIG. 1.

As illustrated in FIG. 1, the magnetic liquid sealing device 100 according to the embodiments of the present disclosure includes a shaft casing 1, a rotating shaft 2, two bearings 3, two pole shoes 4, a permanent magnet 5, a heat conductive rod 6, and a heat dissipating jacket 7.

Specifically, the shaft casing 1 defines a shaft chamber 101 therein. The rotating shaft 2 is rotatably arranged in the shaft chamber 101, and the rotating shaft 2 extends from one end of the shaft chamber 101 to the other end of the shaft chamber 101. The two bearings 3 are individually fitted over the rotating shaft 2. The two pole shoes 4 are individually fitted over the rotating shaft 2 and are located between the two bearings 3. Magnetic liquid 13 is absorbed between an inner peripheral surface of each pole shoe 4 and an outer peripheral surface of the rotating shaft 2. The outer peripheral surface of each pole shoe 4 has a blind hole 402 extending along a radial direction of the pole shoe. The permanent magnet 5 is fitted over the rotating shaft 2 and is located between the two pole shoes 4. The heat conductive rod 6 is inserted in the blind hole 402, the heat dissipating jacket 7 is fitted over the shaft casing 1, and the heat conductive rod 6 is connected with the heat dissipating jacket 7 through a connecting member 11.

It could be understood that in a case that the rotating shaft 2 operates at a high speed, the temperature rise generated by frictional dissipation of the magnetic liquid 13 is accumulated at a sealing gap part of the pole shoe 4 close to the rotating shaft 2. However, in the embodiments of the present disclosure, the outer peripheral surface of each pole shoe 4 has the blind hole 402 extending along the radial direction, the heat conductive rod 6 can be inserted in the blind hole 402 and conducts the heat generated in the sealing gap part, thereby quickly lowering the temperature in the sealing gap part, so as to avoid that the too high temperature in the sealing gap affects the magnetization performance of the magnetic liquid 13 and the permanent magnet 5 and hence deteriorates the sealing effect. Meanwhile, the heat dissipating jacket 7 is fitted over the shaft casing 1, and the heat conductive rod 6 is connected with the heat dissipating jacket 7 by the connecting member 11, such that the heat transferred by the heat conductive rod 6 can be quickly dissipated upon reaching the heat dissipating jacket 7, thereby reducing the temperature rise generated in the whole magnetic liquid sealing device 100 during the rotation of the rotating shaft 2, and better ensuring the sealing effect of the magnetic liquid sealing device 100.

In addition, compared with the related art, the heat dissipation method of the heat conductive rod 6 and the heat dissipating jacket 7 adopted by the magnetic liquid sealing device 100 of the present disclosure does not need to add water cooling circulation or a cooling circuit, has a simple structure, requires no maintenance, and is particularly suitable for sealing situations with compact structures and small volumes.

In the magnetic liquid sealing device 100 with the heat conductive rod and the heat dissipating jacket according to the embodiments of the present disclosure, since the outer peripheral surface of the pole shoe 4 is provided with the blind hole 402 in which the heat conductive rod 6 is inserted, and the heat dissipating jacket 7 connected with the heat conductive rod 6 is fitted over the shaft casing 1, the heat conductive rod 6 can conduct the heat in the sealing gap to the heat dissipating jacket 7, so as to achieve quicker heat dissipation, thereby avoiding that the too high temperature in the sealing gap affects the magnetization performance of the magnetic liquid 13 and the permanent magnet 5 and hence deteriorates the sealing effect.

It should be noted that the magnetic liquid 13 can be selected based on actual sealing media and working environments. For a relatively high temperature environment, diester-based magnetic liquid or fluoroether oil-based magnetic liquid can be selected as the magnetic liquid 13. A rare earth permanent magnet, such as Nd—Fe—B permanent magnet, is selected as the permanent magnet 5. Under a condition with higher temperature, the permanent magnet 5 can be made of Sm2Co17. The two pole shoes 4 can be made of materials with good magnetic conductivity, such as 2Cr13 stainless steel, electric pure iron, and the like. The shaft casing 1 can be made of non-magnetic materials, such as 316L stainless steel. Of course, it should be noted herein that the above material selections of the magnetic liquid 13, the permanent magnet 5, the pole shoes 4 and the shaft casing 1 are illustrative rather than specifically restrictive. That is, the materials of the magnetic liquid 13, the permanent magnet 5, the pole shoes 4, and the shaft casing 1 can be adjusted according to actual requirements, and are not limited to the above examples.

In addition, the connecting member 11 between the heat conductive rod 6 and the heat dissipating jacket 7 may be a screw, a rivet, a pin, and the like. The type of the connecting member 11 can be selected according to actual requirements and is not limited herein.

In some embodiments, as illustrated in FIG. 1, a plurality of blind holes 402 are provided in each pole shoe 4 and distributed evenly along a circumferential direction. Accordingly, a plurality of heat conductive rods 6 are provided and inserted in the blind holes 402. In such a way, the heat dissipation effect of the liquid sealing device can be improved, thereby avoiding the phenomenon that the magnetic properties of the magnetic liquid 13 and the permanent magnet 5 are degraded due to excessive temperature and hence the sealing pressure resistance of the magnetic liquid sealing device 100 is diminished.

Advantageously, four to six heat conductive rods 6 are provided, and each heat conductive rod 6 is formed as a cylinder made of red copper, which cannot only achieve better heat dissipation effect, but also facilitate the mounting of the heat conductive rods 6. Of course, it should be noted that the quantity, material and shape of the heat conductive rod 6 can vary according to actual situations, and are not limited to the above limitations.

In some embodiments, as illustrated in FIG. 1, each of the two pole shoes 4 is provided with a convex rim 401 on a side away from the other pole shoe, the convex rim 401 abuts against an outer circle of the bearing 3, and each of the two pole shoes 4 abuts against an end surface of the permanent magnet 5 on a side facing the other pole shoe. Thus, friction between an end surface of the pole shoe 4 and an end surface of the bearing 3 can be reduced, and hence the friction heat generated during the rotation of the rotating shaft 2 can be further reduced, so as to ensure the sealing effect of the magnetic liquid sealing device 100. It should be noted herein that the convex rim 401 mainly acts to position the outer circle of the bearing 3, and the specific shape of the convex rim 401 can be adjusted according to actual requirements and is not specifically limited herein.

In some embodiments, as illustrated in FIG. 1, the magnetic liquid sealing device 100 with the heat conductive rod and the heat dissipating jacket also includes a sealing ring 8. A pair of sealing rings 8 is provided between each pole shoe 4 and the shaft casing 1, and the heat conductive rod 6 is located between the sealing rings 8 arranged in pairs. It should be understood that the sealing rings 8 are provided between each pole shoe 4 and the shaft casing 1 to better ensure the sealing effect between the pole shoe 4 and the shaft casing 1, and the arrangement of the sealing rings 8 on both sides of the heat conductive rod 6 prevents the heat conductive rod 6 from being polluted, which may otherwise reduce the heat conduction effect. It should be noted that the size, material, and sealing class of the seal ring 8 can be selected according to actual requirements, which are not specifically limited herein.

In some embodiments, as illustrated in FIG. 1, one end of the shaft casing 1 is formed with a first protrusion 102, and one of the bearings 3 abuts against the first protrusion 102; the other end of the shaft casing 1 is connected with a flange 12, and the flange 12 has a second protrusion 1201 extending into the shaft chamber 101. It should be understood that the presence of the first protrusion 102 and the second protrusion 1201 enables the bearing 3, the pole shoe 4 and the permanent magnet 5 to be better positioned in an axial direction of the rotating shaft 2, thereby avoiding axial movement of the bearing 3, the pole shoe 4 and the permanent magnet 5, which may otherwise affect the sealing effect of the magnetic liquid sealing device 100. Of course, the specific shape and size of the first protrusion 102 and the second protrusion 1201 can be designed according to actual requirements, which are not specifically limited herein.

In some specific embodiments, the magnetic liquid sealing device 100 with the heat conductive rod and the heat dissipating jacket also includes a sleeve 9 fitted over the rotating shaft 2 and located between the second protrusion 1201 and the other bearing 3. Thus, the axial positioning of the bearing 3, the pole shoe 4 and the permanent magnet 5 can be better realized, so as to ensure the sealing effect of the magnetic liquid sealing device 100.

In some specific embodiments, as illustrated in FIG. 1, the magnetic liquid sealing device 100 with the heat conductive rod and the heat dissipating jacket also includes an adjusting washer 10 sandwiched among the shaft casing 1, the heat dissipating jacket 7 and the flange 12. Thus, the sealing effect between the shaft casing 1, the heat dissipating jacket 7 and the flange 12 can be ensured, preventing pollutants from entering the shaft chamber 101 through the gap among the shaft casing 1, the heat dissipating jacket 7 and the flange 12. The specific type of the adjusting washer 10 is not limited herein and the material and size of the adjusting washer 10 can be selected according to actual requirements.

In some optional embodiments, the heat dissipating jacket 7 is made of one material of red copper and heat conducting graphite. Thus, the heat dissipating jacket 7 can quickly dissipate the heat transferred by the heat conductive rod 6. Of course, in other embodiments of the present disclosure, the heat dissipating jacket 7 may also be made of other heat conducting materials.

In some embodiments, the thickness of the heat dissipating jacket 7 is from 2 mm to 10 mm. It should be understood that a smaller or larger thickness of the heat dissipating jacket 7 will affect the heat dissipation effect thereof. It proves through experiments that the heat dissipating jacket 7 has a better heat dissipation effect when its thickness is between 2 mm and 10 mm. Of course, in other embodiments of the present disclosure, the thickness of the heat dissipating jacket 7 can be selected according to actual situations, which is not limited to the above range.

In some embodiments, as illustrated in FIG. 1, one end of the heat conductive rod 6 passes through the shaft casing 1 and abuts against an inner peripheral surface of the heat dissipating jacket 7. Thus, the heat conductive rod 6 can better and faster conduct the heat in the sealing gap to the heat dissipating jacket 7, thereby improving the heat dissipation efficiency of the magnetic liquid sealing device 100.

EMBODIMENT

The magnetic liquid sealing device 100 according to the embodiment of the present disclosure includes a shaft casing 1, a rotating shaft 2, two bearings 3, two pole shoes 4, a permanent magnet 5, a heat conductive rod 6, a heat dissipating jacket 7, a sealing ring 8, a sleeve 9 and an adjusting washer 10.

A shaft chamber 101 is defined in the shaft casing 1. The rotating shaft 2 is rotatably arranged in the shaft chamber 101, and the rotating shaft 2 extends from one end of the shaft chamber 101 to the other end of the shaft chamber 101. The two bearings 3 are individually fitted over the rotating shaft 2. The two pole shoes 4 are individually fitted over the rotating shaft 2 and are located between the two bearings 3. Magnetic liquid 13 is absorbed between an inner peripheral surface of each pole shoe 4 and an outer peripheral surface of the rotating shaft 2. The outer peripheral surface of each pole shoe 4 has a blind hole 402 extending along a radial direction thereof. The permanent magnet 5 is fitted over the rotating shaft 2 and is located between the two pole shoes 4. Each of the two pole shoes 4 is provided with a convex rim 401 on a side away from the other pole shoe, the convex rim 401 abuts against an outer circle of the bearings 3, and each of the two pole shoes 4 abuts against an end surface of the permanent magnet 5 on a side facing the other pole shoe. A pair of sealing rings 8 is provided between each pole shoe 4 and the shaft casing 1, and the sealing rings 8 arranged in pairs are located on both sides of the heat conductive rod 6. One end of the shaft casing 1 is formed with a first protrusion 102, and one bearing 3 abuts against the first protrusion 102; the other end of the shaft casing 1 is connected with a flange 12, and the flange 12 has a second protrusion 1201 extending into the shaft chamber 101; the sleeve 9 is provided between the other bearing 3 and the second protrusion 1201. The heat conductive rod 6 is inserted in the blind hole 402, and one end of the heat conductive rod 6 passes through the shaft casing 1 and abuts against an inner peripheral surface of the heat dissipating jacket 7. The heat dissipating jacket 7 is fitted over the shaft casing 1, and the heat conductive rod 6 is connected with the heat dissipating jacket 7 by a connecting member 11. The adjusting washer 10 is sandwiched among the shaft casing 1, the heat dissipating jacket 7 and the flange 12.

The installation steps of the magnetic liquid sealing device 100 of the embodiments are as follows:

Four sealing rings 8 are fitted on the two pole shoes 4, so as to form two pole shoes 4 having sealing rings 8. One of the bearings 3 is mounted in the shaft casing 1, and the outer circle of this bearing 3 abuts against the first protrusion 102. Afterwards, one pole shoe 4 with the sealing rings 8, the permanent magnet 5, the other pole shoe 4 with the sealing rings 8, the other bearing 3, and the sleeve 9 are mounted in the shaft casing 1 successively. Then, the shaft casing 1 is adjusted such that through holes in the shaft casing 1 correspond to the two pole shoes 4 respectively. Meanwhile, the adjusting washer 10 is mounted and the flange 12 is fitted on the shaft casing 1 such that the second protrusion 1201 abuts against an end surface of the sleeve 9. Next, a plurality of heat conductive rods 6 are inserted into the two pole shoes 4, the heat dissipating jacket 7 is fitted over the outside of the shaft casing 1, and the plurality of heat conductive rods 6 are connected with the heat dissipating jacket 7 by bolts. Finally, the assembly of the magnetic liquid sealing device 100 can be completed by inserting the rotating shaft 2 from one end of the shaft casing 1.

Reference throughout this specification to terms "an embodiment," "some embodiments," "an illustrative embodiment," "an example," "a specific example," or "some examples" means that a particular feature, structure, material, or characteristic described in connection with the embodiment or example is included in at least one embodiment or example of the present disclosure. In this specification, the appearances of the aforesaid terms are not necessarily referring to the same embodiment or example. Moreover, the particular features, structures, materials, or characteristics described can be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure. The scope of this disclosure is defined by the claims and their equivalents.

The invention claimed is:

1. A magnetic liquid sealing device having a heat conductive rod and a heat dissipating jacket, comprising:
   a shaft casing defining a shaft chamber therein;
   a rotating shaft rotatably provided in the shaft chamber, and extending from one end of the shaft chamber to the other end of the shaft chamber;
   two bearings individually fitted over the rotating shaft;
   two pole shoes individually fitted over the rotating shaft and located between the two bearings, magnetic liquid being absorbed between an inner peripheral surface of each pole shoe and an outer peripheral surface of the rotating shaft, and an outer peripheral surface of each pole shoe having a blind hole extending along a radial direction of the pole shoe; and
   a permanent magnet fitted over the rotating shaft and located between the two pole shoes;
   wherein the heat conductive rod is inserted in the blind hole; and
   wherein the heat dissipating jacket is fitted over the shaft casing and connected with the heat conductive rod through a connecting member.

2. The magnetic liquid sealing device according to claim 1, wherein a plurality of blind holes are provided on each pole shoe and distributed evenly along a circumferential direction.

3. The magnetic liquid sealing device according to claim 2, wherein one end of the heat conductive rod passes through the shaft casing and abuts against an inner peripheral surface of the heat dissipating jacket.

4. The magnetic liquid sealing device according to claim 1, wherein each of the two pole shoes is provided with a convex rim on a side away from the other pole shoe, the convex rim abutting against an outer circle of the bearing, and each of the two pole shoes abuts against an end surface of the permanent magnet on a side facing the other pole shoe.

5. The magnetic liquid sealing device according to claim 4, wherein one end of the heat conductive rod passes through the shaft casing and abuts against an inner peripheral surface of the heat dissipating jacket.

6. The magnetic liquid sealing device according to claim 1, further comprising: a pair of sealing rings provided between each pole shoe and the shaft casing, the heat conductive rod being located between the sealing rings arranged in pairs.

7. The magnetic liquid sealing device according to claim 6, wherein one end of the heat conductive rod passes through the shaft casing and abuts against an inner peripheral surface of the heat dissipating jacket.

8. The magnetic liquid sealing device according to claim 1, wherein one end of the shaft casing is formed with a first protrusion, one of the bearings abuts against the first protrusion, the other end of the shaft casing is connected with a flange, and the flange has a second protrusion extending into the shaft chamber.

9. The magnetic liquid sealing device according to claim 8, wherein one end of the heat conductive rod passes through the shaft casing and abuts against an inner peripheral surface of the heat dissipating jacket.

10. The magnetic liquid sealing device according to claim 8, further comprising: a sleeve fitted over the rotating shaft and located between the second protrusion and the other bearing.

11. The magnetic liquid sealing device according to claim 10, wherein one end of the heat conductive rod passes through the shaft casing and abuts against an inner peripheral surface of the heat dissipating jacket.

12. The magnetic liquid sealing device according to claim 8, further comprising: an adjusting washer sandwiched among the shaft casing, the heat dissipating jacket and the flange.

13. The magnetic liquid sealing device according to claim 12, wherein one end of the heat conductive rod passes through the shaft casing and abuts against an inner peripheral surface of the heat dissipating jacket.

14. The magnetic liquid sealing device according to claim 1, wherein the heat dissipating jacket is made of one material of red copper and heat conducting graphite.

15. The magnetic liquid sealing device according to claim 14, wherein one end of the heat conductive rod passes through the shaft casing and abuts against an inner peripheral surface of the heat dissipating jacket.

16. The magnetic liquid sealing device according to claim 1, wherein the thickness of the heat dissipating jacket ranges from 2 mm to 10 mm.

17. The magnetic liquid sealing device according to claim 16, wherein one end of the heat conductive rod passes through the shaft casing and abuts against an inner peripheral surface of the heat dissipating jacket.

18. The magnetic liquid sealing device according to claim 1, wherein one end of the heat conductive rod passes through the shaft casing and abuts against an inner peripheral surface of the heat dissipating jacket.

* * * * *